(12) United States Patent
Shew et al.

(10) Patent No.: US 8,770,770 B2
(45) Date of Patent: Jul. 8, 2014

(54) LIGHT ASSEMBLY (75) Inventors: Larry N. Shew, Highland, MI (US);
Jeremy M. Shew, Swartz Creek, MI (US)

(73) Assignee: Larry N. Show, Highland, MI (US)

( * ) Notice: Subject to any disclaimer, the term of this patent is extended or adjusted under 35 U.S.C. 154(b) by 94 days.

(21) Appl. No.: 12/983,227

(22) Filed: Dec. 31, 2010

(65) Prior Publication Data

US 2011/0163672 A1 Jul. 7, 2011

Related U.S. Application Data (60) Provisional application No. 61/335,132, filed on Dec. 31, 2009.

(51) Int. Cl.
 F21V 23/04 (2006.01)
 F21S 4/00 (2006.01)
(52) U.S. Cl.
 USPC .............. 362/20; 362/641; 362/276; 362/225
(58) Field of Classification Search
 USPC .............. 362/20, 184, 641, 225, 276, 249.02; 313/86; 315/86
 See application file for complete search history.

(56) References Cited

U.S. PATENT DOCUMENTS

| | | | | |
|---|---|---|---|---|
| 4,255,746 A * | 3/1981 | Johnson et al. | ............... | 340/577 |
| 5,655,830 A * | 8/1997 | Ruskouski | .................... | 362/240 |
| 5,786,767 A * | 7/1998 | Severino | ....................... | 340/628 |
| RE36,696 E * | 5/2000 | Blackman | ....................... | 362/20 |
| 6,142,648 A * | 11/2000 | Logan et al. | .................. | 362/234 |
| 7,478,924 B2 * | 1/2009 | Robertson | ..................... | 362/240 |
| 8,333,481 B2 * | 12/2012 | Deng | .............................. | 362/20 |
| 8,348,453 B2 * | 1/2013 | Cumberland et al. | ........ | 362/192 |
| 2002/0024806 A1 * | 2/2002 | Petzl et al. | ..................... | 362/184 |
| 2006/0274525 A1 * | 12/2006 | Nielson et al. | ................ | 362/249 |
| 2010/0002411 A1 * | 1/2010 | Zhong | ............................. | 362/20 |
| 2010/0020527 A1 * | 1/2010 | Fiermuga | ........................ | 362/20 |
| 2010/0039792 A1 * | 2/2010 | Meyers et al. | .................. | 362/20 |

* cited by examiner

*Primary Examiner* — Peggy Neils

(74) *Attorney, Agent, or Firm* — L.C. Begin & Associates, PLLC

(57) ABSTRACT

The present invention includes an LED lighting assembly containing: a housing; one or more solid state lighting units contained within the housing and actuated by alternating current power; a night light contained within the housing and operably communicating with the solid state lighting units, the night light actuated by direct current power in the absence of light from the solid state lighting units; one or more light emitting diodes contained within the night light; and a battery source for powering the night light in the event of power interruption.

In yet another aspect of the invention, a lighting unit contains: a housing or elongated tube; one or more light emitting diodes contained within the housing or elongated tube; and a battery source contained within the housing or elongated tube, the battery source configured to selectively power the light emitting diodes with direct current energy.

5 Claims, 6 Drawing Sheets

LIGHT ASSEMBLY

CROSS REFERENCE TO RELATED APPLICATIONS

This application claims the benefit of U.S. Provisional Application Ser. No. 61/335,132 having a filing date of Dec. 31, 2009.

BACKGROUND OF THE INVENTION

The present invention relates to light assemblies that incorporate a night-light and/or an emergency light within an LED (light emitting diode) light tube assembly. Alternatively, the novel LED light assembly of the present invention may be designed into a single light source having a multi-functional light. During the day, the LED light tube will function as the primary light source, operating all the LEDs within the light tube assembly. During the night, the LED light tube will function as a night light, operating only a limited number of LEDs to avoid complete darkness within the space and during a power loss, operating the same number of LEDs to again avoid darkness. The inventor contemplates that these concerns may most efficiently be managed during the construction of a new home or new commercial building.

Presently, there are various conventional light fixtures that incorporate emergency lighting, and are powered by AC energy with battery backup. When the power is unexpectedly interrupted due to a storm or other event, the emergency lighting automatically illuminates. Cost is one issue related to most of these conventional emergency lighting systems as they are very expensive.

Yet another issue for a conventional stand-alone emergency lighting system that may contain incandescent, fluorescent or halogen lamp and may be powered by expensive, alkaline, sealed lead battery modules is the relatively short charge time. Many of these conventional systems are generally only designed to provide at a maximum between one to three hours of effective emergency lighting. Not only is this approach expensive, this presents a concern for emergency generated power outages that last longer than three hours.

Yet another issue is that current design trends favor the spatial and aesthetic benefits typically provided by fluorescent tubes, even though fluorescent tubes cost more to operate than LED assemblies.

Yet another concern is the cost of illuminating conventional lighting such as incandescent, fluorescent, or halogenated light sources.

Fixtures using fluorescent tubes or LED light tubes as its source of lighting are common in homes, offices and retail stores. Fluorescent tubes may typically use 60-80% more energy than LED light tubes. Fluorescent lighting system are not practicable for such emergency lighting due to their high voltage and alternating current requirements making a battery backup difficult during power failure. It is therefore an ongoing effort to improve LED lighting sources to provide adequate lighting for longer periods while reducing the manufacturing and operating costs.

Typical LED light tube assemblies currently on the market operate only as a primary light source for the home and the work place. As a way to provide night lighting within a space, owners typically would leave on several light fixtures during the night. As energy costs continue to grow, owners are looking for other options to reduce energy cost. The present invention would mitigate the need of leaving several light fixtures on during the night, saving energy cost for the owner. The present invention may also provide additional operating time during a power failure, at the same time improving the light quality of the night-light at night.

It would therefore be an improvement in the art to provide an LED tube lighting assembly that resolves the aforementioned concerns.

SUMMARY OF THE INVENTION

The above-referenced concerns are resolved by providing a first embodiment of an LED lighting assembly containing: a housing; one or more solid state lighting units contained within the housing and actuated by alternating current power; a night light contained within the housing and operably communicating with the solid state lighting units, the night light actuated by direct current power in the absence of light from the solid state lighting units; one or more light emitting diodes contained within the night light; and a battery source for powering the night light in the event of power interruption.

A second embodiment of an LED lighting assembly in accordance with the present invention includes a light assembly containing: a housing; one or more solid state lighting units contained within the housing and actuated by alternating current power; a night light contained within the housing and operably communicating with the solid state lighting units, the night light actuated by direct current power in the absence of light from the solid state lighting units; and a direct current power supply contained within the housing and operably communicating with the night light; one or more light emitting diodes contained within the night light and powered by the direct current power supply; a battery source for powering the night light in the event of power interruption; and a battery charger within the housing and actuated by direct current power, the battery charger operably communicating with the battery source.

In yet another aspect of the invention, a lighting unit contains: a housing or elongated tube; one or more light emitting diodes contained within the housing or elongated tube; and a battery source contained within the housing or elongated tube, the battery source configured to selectively power the light emitting diodes with direct current energy.

DETAILED DESCRIPTION OF THE PREFERRED EMBODIMENT(S)

Figure 1:
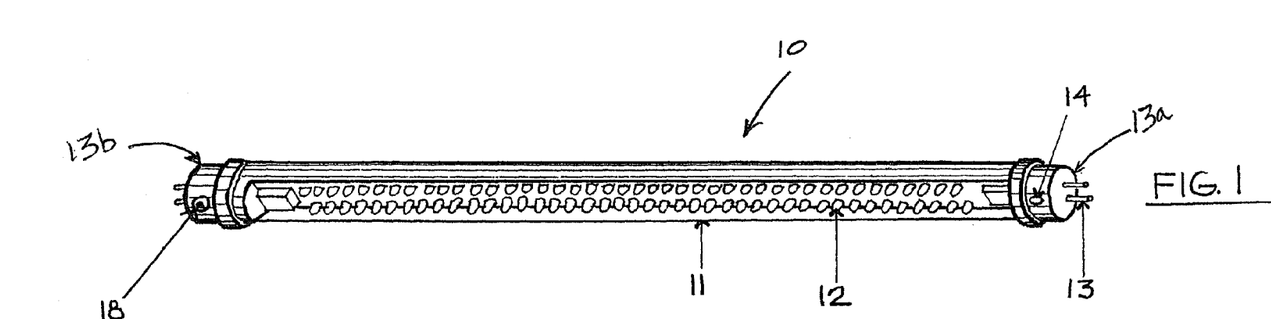
FIG. 1 illustrates a perspective view of one embodiment of a light assembly in accordance with the present invention.

FIG. 1 is an illustration of a perspective view of a first embodiment of an emergency or backup lighting assembly 10 employing one or more light emitting diodes (LEDs). A housing or elongated tube 11 contains all internal circuitry and lighting as described below and may be manufactured as known in the art. In general, the tube 11 may be substantially similar to the housing or tube typically employed for a fluorescent light bulb, for example.

As shown in FIG. 1, an array or subassembly 12 of one or more light emitting diodes is contained within the housing 11 and may be substantially coextensive with the housing 11. The array 12 may be formed as known in the art. At least one power supply connector 13 is provided at a first end 13a for charging the batteries as explained below. In the embodiment shown in FIG. 1, a first and a second connector 13 are provided at a first end 13a and a second end 13b, respectively. A photocell switch 14 operably communicates with the LED circuitry to provide direct current (DC) or power thereto, and actuates and deactivates the LED circuitry when light is absent or present, respectively.

Figure 2:
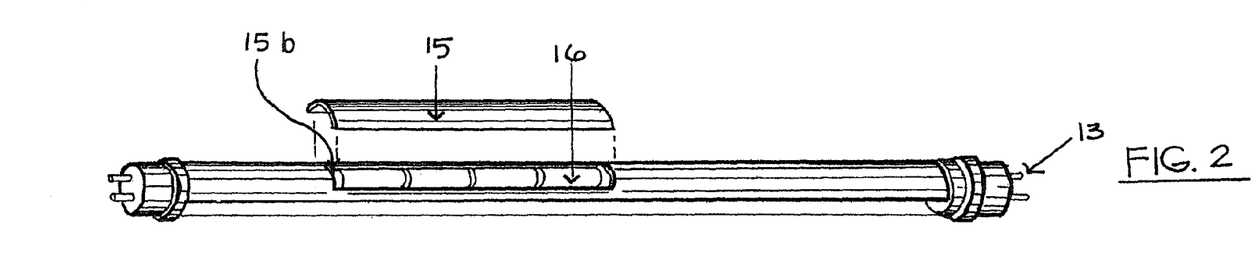
FIG. 2 illustrates a perspective view of one embodiment of a light assembly in accordance with the present invention.

As shown in FIG. 2, a panel 15 is removably fixed to housing 11 and covers an inner cavity or recess 15b. One or more batteries 16, preferably lithium rechargeable batteries, may be stored within recess 15b and provide DC power to the LED array 12 upon switching of photocell switch 14. A test circuit 18 may be provided on the outer housing 11 to provide convenient testing of the emergency lighting circuitry.

Figure 3:
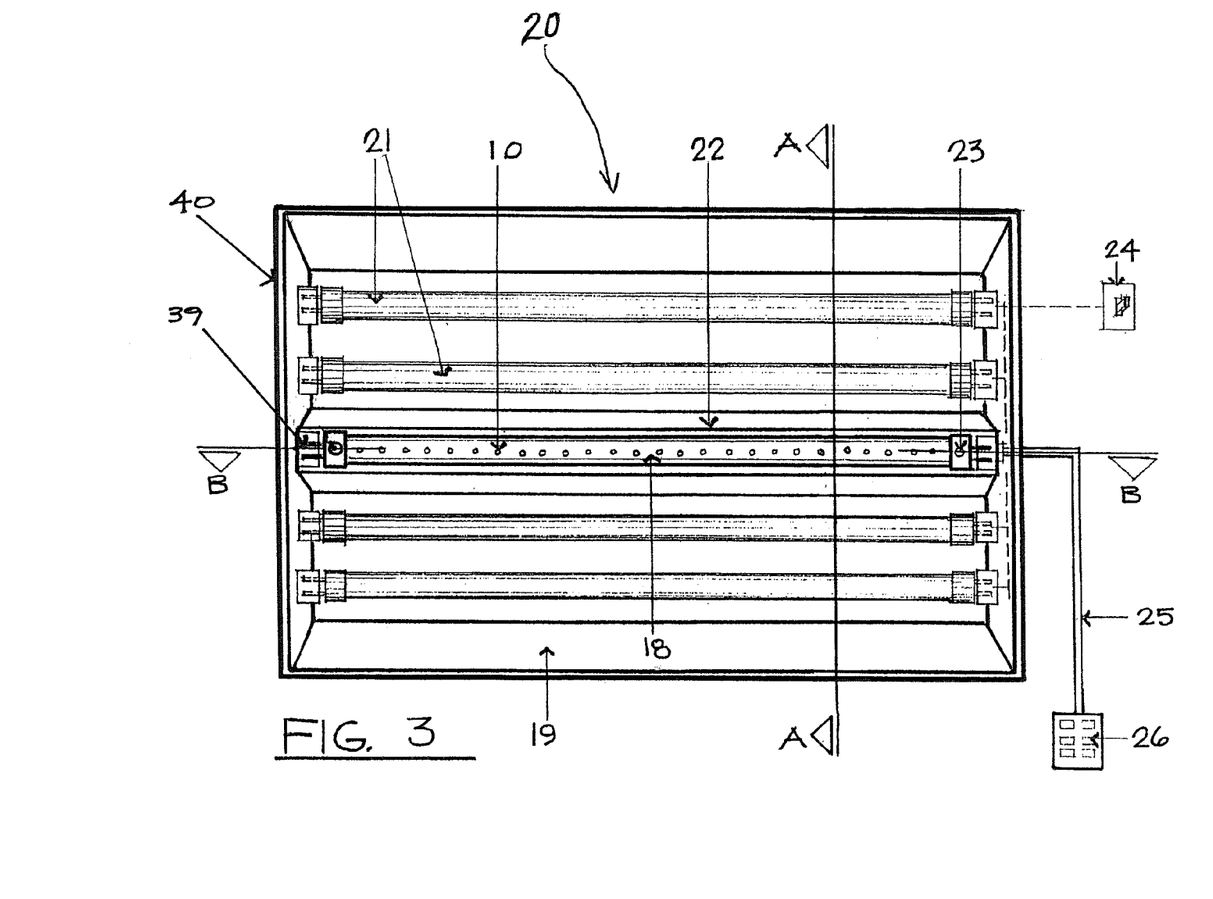
FIG. 3 illustrates a view of one embodiment of a light assembly within a conventional fluorescent troffer assembly, in accordance with the present invention.

In one embodiment shown in FIG. 3, a conventional fluorescent light assembly 19 is provided in accordance with the present invention. A troffer or housing 20 contains one or more fluorescent tubes 21, all AC (alternating current) powered in a conventional manner. Other solid state lighting assemblies/units 21 are contemplated in accordance with the present invention, and may include other solid state lighting units such as incandescent, LED, mercury-based, and other types of solid state lighting units. As also indicated or alluded to in FIG. 3, a ballast (not shown) may also be provided to control the electric current applied to the fluorescent tubes 21. A ballast cover 22 may be provided down the center of the solid state lighting unit 21 thereby hiding the ballast area from view. FIG. 3 also illustrates an elongated. LED night light assembly 10, retained outside of the ballast cover 22. One or more sockets 39 receive one or more corresponding connectors 13 at ends 13a and 13b of light assembly 10, thereby providing alternating current power to the night light assembly 10 to at least one of the connectors 13. Alternating current may be directly provided by a continuous circuit from service/power box 26 to socket(s) 39 vis a vis line 25, for example. The fluorescent bulb(s) 21 function as the primary light, and are operated by a remote switch 24. A photocell switch 23 operatively communicates with light assembly 10 to activate and deactivate the light assembly 10 by turning the bulb(s) 21 off and on, respectively. Accordingly, as the bulbs 21 are turned off at the end of the day, the photocell 23 will recognize the waning light and activate the light assembly 10. On the other hand, when the lights 21 are turned on, the photocell 24 will recognize the increasing light and deactivate the light assembly 10.

Figure 7:
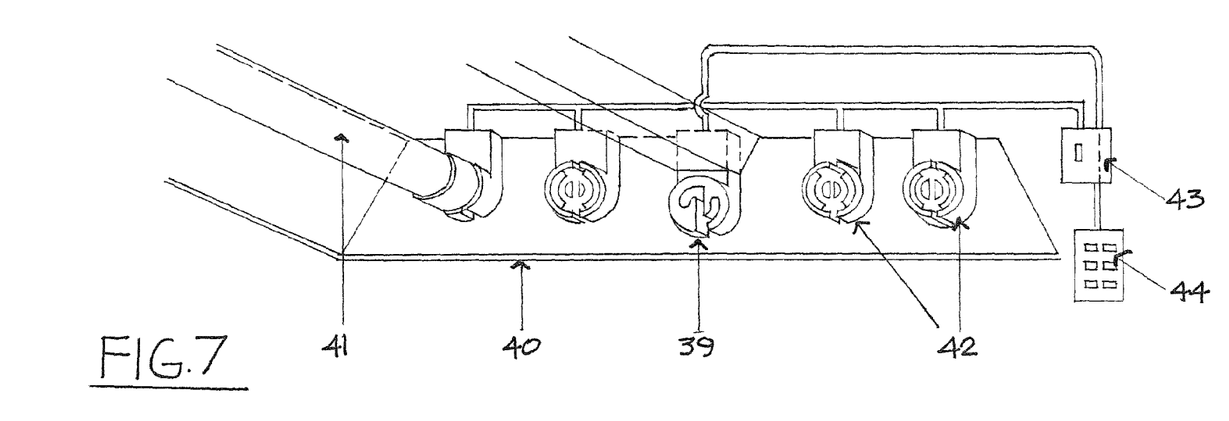
FIG. 7 illustrates a perspective view of an end portion of a fluorescent troffer in accordance with the present invention.
Figure 10:
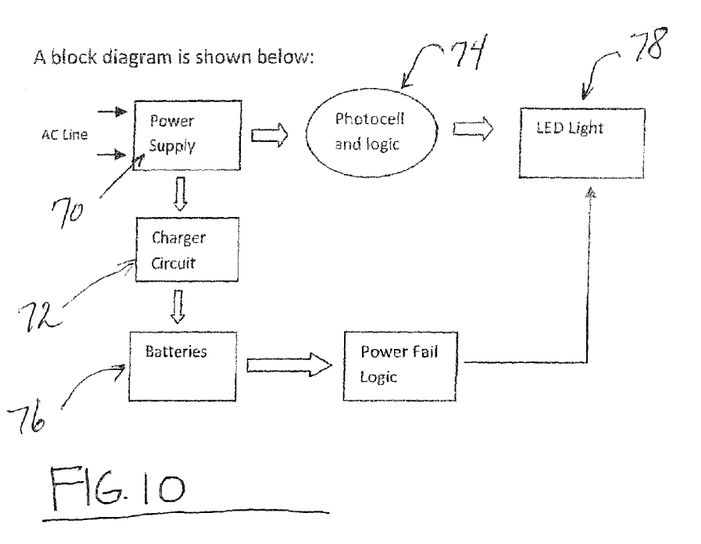
FIG. 10 illustrates an electronic schematic in accordance with the present invention.

FIG. 7 exemplifies one end 40 of the troffer or housing 20 of FIG. 3. Sockets 42 are configured to receive conventional solid state lighting units such as fluorescent or LED tubes, while socket 39 is configured to receive a night or emergency light unit 10 in accordance with the present invention. A three-wire system is illustrated in FIG. 7 and eliminates the need for a toggle switch or other switch as the actuation and de-actuation means for the fluorescent or other solid state lighting source and the second light source (night light). Referring to FIGS. 3, 7, and 10, the LED array 78 powered by sockets 39 is activated by electronic communication with a standard AC power supply 44 (e.g. 110 VAC). As photocell 43 detects a darkened condition, alternating current in normal circumstances is then only applied to socket 39, and not to sockets 42. As shown in FIGS. 3-6, for example, the periphery of the housings 30 is generally depicted as being circumferential. It will be appreciated that the peripheral geometry of the housing 30 may be formed to accommodate the spatial requirements of the circuitry 35, and may therefore for example only, take on a "half-rectangular" cross-section to fit in the requisite components. Nevertheless, the circumferential geometry of the housing 30 is preferably maintained at least around the ends 13a and 13b to facilitate a ready receipt of the connectors 34 within the female sockets.

Various other optional features such as dimmer switches or multi-colored LEDs may be provided.

Figure 4:
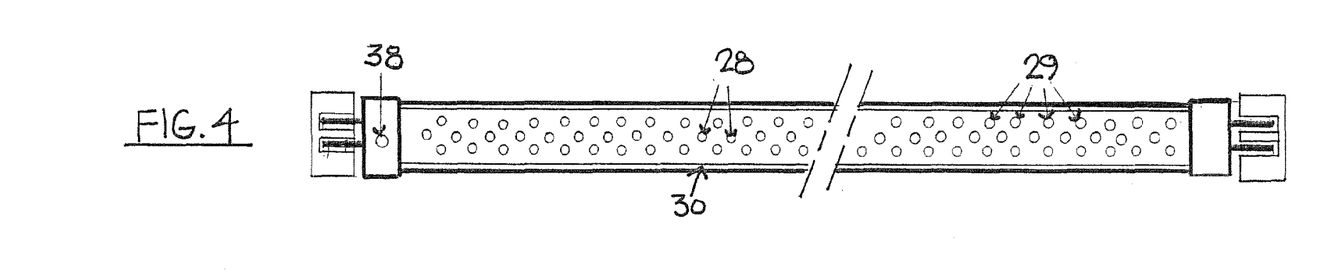
FIG. 4 illustrates a top view of one embodiment of a light assembly in accordance with the present invention.
Figures 5, 6:
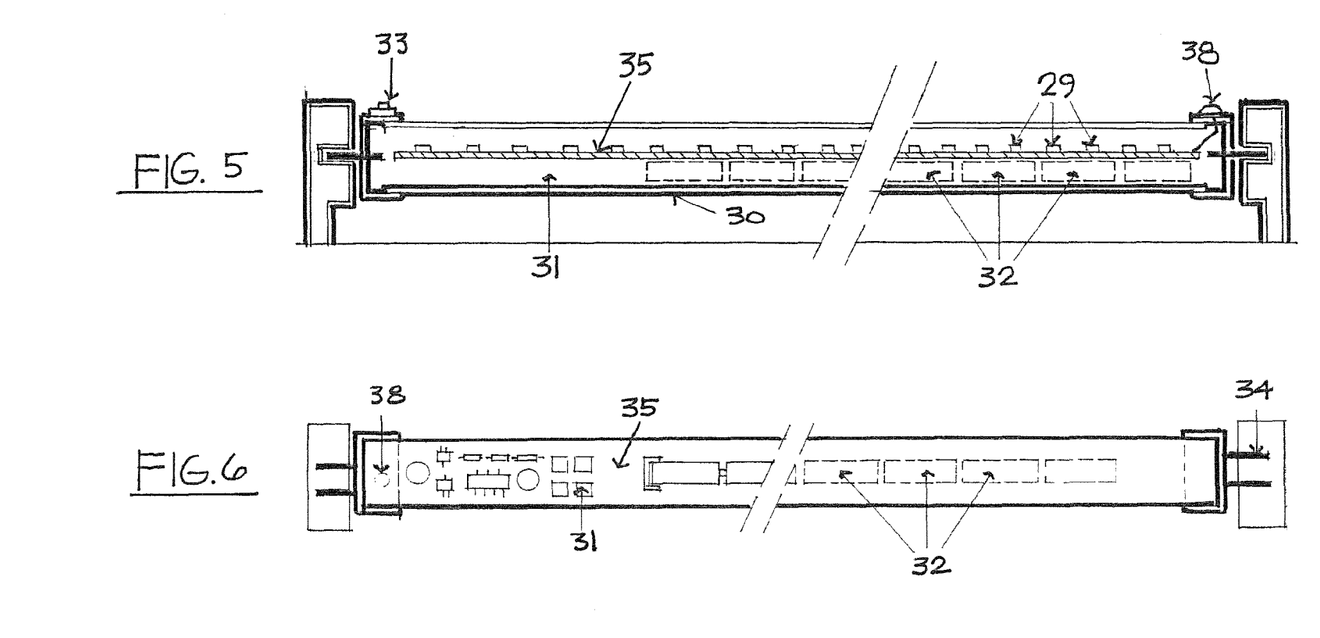
FIG. 5 illustrates a cross-section view of one embodiment of a light assembly in accordance with the present invention.
FIG. 6 illustrates a view of a circuit board of one embodiment of a light assembly in accordance with the present invention.

As shown in yet another embodiment in FIGS. 4, 5, and 6, a circuit board 35 is contained within night light housing 30 and provides circuitry to convert an incoming 110 VAC to 12-15 VDC. A photocell 38 is provided at one end of the housing 30, and as explained below relative to FIG. 10, operably communicates with the LED array 29 to provide DC power in the absence of light from the primary light source (not shown in these figures). Batteries 32 are contained within housing 30 and operably communicate with circuitry 31 and 35 (as explained relative to FIG. 10) in the event of a power interruption. A test control 33 is coupled to the LED array 29 and is useful for service tests to comply with regulatory requirements on periodic testing of emergency service equipment.

An AC/DC power supply/converter 70 is schematically shown in FIG. 10 and is provided to supply direct current power to the plurality of light emitting diodes or LED array 29. Converter 70 may, but not by way of limitation, be provided by V-Infinity of Oregon as identified as part number FSC-S15-15U, for example. It will be appreciated that other sources of alternating current may also be rectified or converted to appropriate amounts of direct current depending on design criteria. For example, 220 VAC could also be rectified to 15 VDC if desired.

As also schematically shown in FIG. 10, converter 70 therefore operably and electronically communicates with battery source charger 72 and to a photocell 74, thereby providing direct current power to each. Alternatively, a rectifier may instead be provided rather than the converter 70, so long as direct current power ultimately is provided in appropriate amounts to the charger 72 and the LED array 78. Charger 72 electronically or operably communicates with one or more batteries 76 to maintain a charge to the rechargeable batteries 76. In the event of power failure, direct current by and through photocell 76 is interrupted due to the absence of alternating current being supplied to direct current power supply 70. Accordingly, in the event of power failure, direct current is provided from the batteries 76 to LED array 78.

Batteries 76 may be formed from nickel-metal hydrides, or from lithium ion technology. The batteries 76 may be provided from Sanyo Corporation of Japan, for example. The battery charger 72 may be, for example only and not by way of limitation, be provided from various designs available from Texas Instruments, part number bq24702, for example.

The charger 72 may provide a "fast" charge for batteries depleted from a prolonged use. Or, the charger 72 may provide a "trickle" or "top off" charge to maintain the charge at a substantial maximum without overcharging. Accordingly, the charger 72 may also be designed to contain a "detector" mode whereby the charger 72 can identify whether a "fast charge" or "trickle charge" is necessary based on battery charge measurements. The LED array 78 may be provided from companies such as Stand Electronic Co., Limited located in Guangdong, China.

As also schematically exemplified in FIG. 10, the photocell 74 may for example, but not by way of limitation, be provided from Advanced Photonix, Inc. as part number PDV-P8101, and is operable based on a darkened condition, either from deactivation of the primary lighting assembly and bulbs 21, or, by the onset of a power outage with resultant darkness. LED light array 29 or 78 is thereby activated based on an absence of light from the primary light assembly and bulbs 21.

Figure 8:
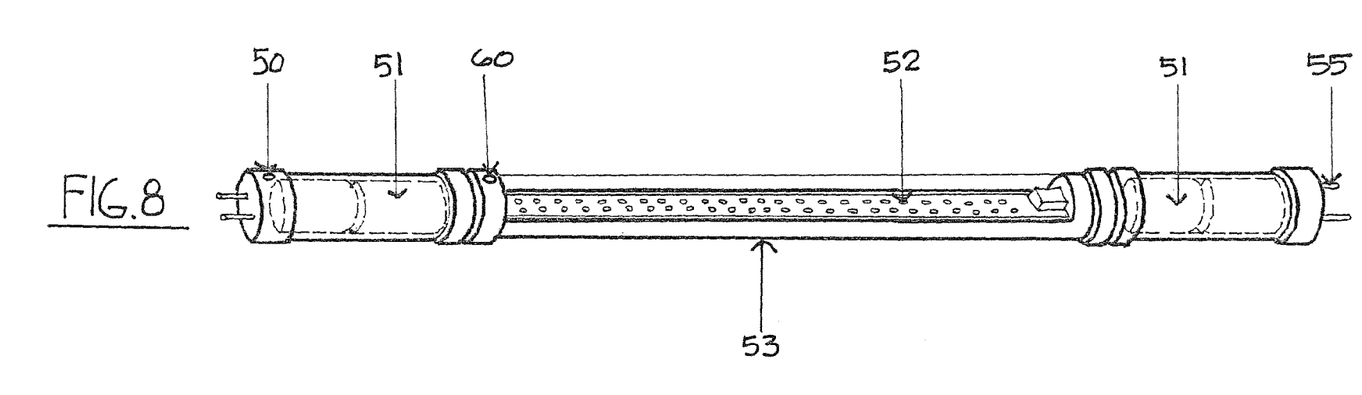
FIG. 8 illustrates a perspective view of a second embodiment of a light assembly in accordance with the present invention.
Figure 9:
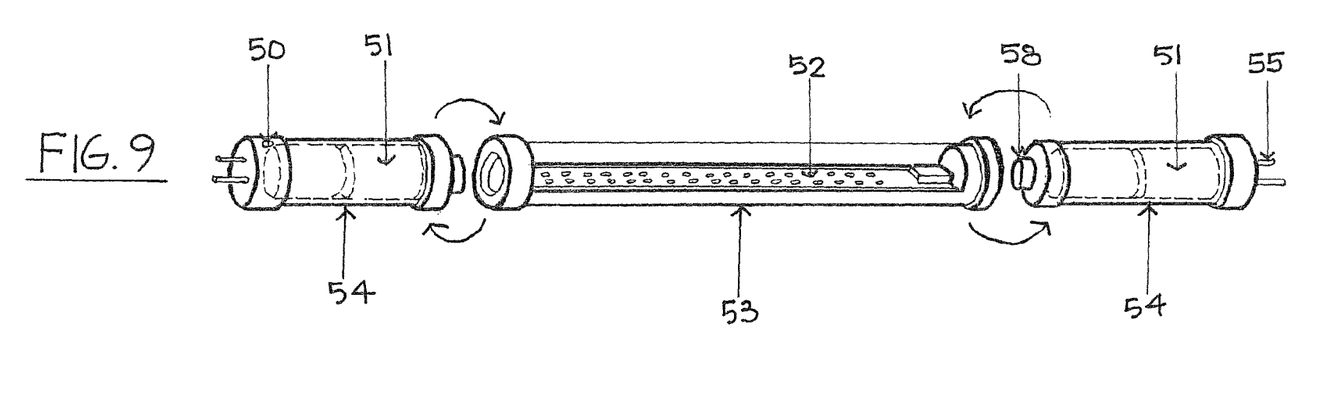
FIG. 9 illustrates a perspective view of a second embodiment showing the connections between the lithium batteries and the light emitting diode(s) in accordance with the present invention.

In yet another embodiment shown in FIGS. 8 and 9, batteries 51 may be provided at opposite ends of the light unit 53 thereby providing emergency or night lighting to the LED array 52. Contacts 55 may be seated within female receptacles within a light assembly such as shown in FIG. 3. As shown in FIG. 9, the batteries 51 may be placed within storage compartments 54.

The compartments 54 may then be rotatably fixed in electronic contact with each end of the LED array 53, thereby providing a direct current power supply in the event of an absence of power from the alternating current supply. Although not shown, it will be appreciated that equivalent circuitry as described by FIG. 10 and as shown in FIGS. 5 and 6 as circuit board 35 are provided in light unit 53 thereby converting or rectifying alternating current to direct current in the same way as described relative to FIG. 10.

Further, the battery source may contain consumable rather than rechargeable batteries. As a result, the charger 72 would not be necessary. The "consumable" battery source would then be actuated based on a default switch from the photocell 74 for example, indicating that direct current supplied from the power supply 70 had been interrupted, whereby the LED array 78 is actuated based on normal or consumable battery power.

It will be understood that the foregoing descriptions of embodiments of the present invention are for illustrative purposes only and should not be construed as limiting the scope of the invention as stated in the appended claims. For example, remote RF switching may be provided from the general power supply thereby providing selective power to the primary light bulbs 21 and the LED array 76. As such, the various structural and operational features herein disclosed are susceptible to a number of modifications commensurate with the abilities of one of ordinary skill in the art, none of which departs from the various permutations described herein.

What is claimed is:

1. A light assembly comprising:
   a housing;
   one or more elongated solid state lighting units substantially coextensive with and contained within said housing and actuated by alternating current power;
   an elongated night light assembly substantially coextensive with and contained within said housing and operably communicating with said elongated solid state lighting units, said elongated night light assembly actuated by alternating current power converted to direct current power in the absence of light from said one or more elongated solid state lighting units, and, said elongated night light assembly containing a first end cap at a first end and a second end cap at a second end wherein said first and second end cans conduct alternating current power;
   a photocell switch for powering said elongated night light assembly with alternating current in the absence of light from said one or more elongated solid state lighting units;
   one or more light emitting diodes contained within said elongated night light assembly; and
   a battery source contained within said elongated night light assembly for powering said elongated night light assembly only in the event of power interruption,
   wherein said one or more elongated solid state lighting units and said elongated night light subassembly are each separately mounted to said housing.

2. A light assembly comprising:
   a housing;
   one or more tubular solid state lighting units substantially coextensive with and contained within said housing and actuated by alternating current power;
   a tubular night light assembly substantially coextensive with and contained within said housing and operably communicating with said tubular one or more solid state lighting units, said tubular night light assembly containing a first end cap at a first end and a second end ca at a second end wherein said first and second end caps conduct alternating current power, and, said tubular night light assembly actuated by alternating current power converted into direct current power in the absence of light from said tubular one or more solid state lighting units;
   one or more light emitting diodes contained within said tubular night light assembly;
   a battery source contained within said tubular night light assembly for powering said tubular night light assembly only in the event of power interruption; and
   a battery charger contained within said tubular night light assembly and actuated by alternating current power, said battery charger operably communicating with said battery source.

3. A fluorescent tube light assembly comprising:
   a housing communicating with an alternating current power supply;
   one or more fluorescent tubes electronically communicating with and removably fixed to said housing;
   a tubular night light assembly substantially coextensive with and in electronic communication with said housing, said tubular night light assembly containing a plurality of light emitting diodes and a first end cap at one end and a second end cap at a second end whereby said first and second end caps conduct alternating current power; and
   a photocell switch for powering said tubular night light assembly with alternating current in the absence of light from said one or more fluorescent tubes.

4. The light assembly of claim 1 wherein said elongated night light assembly further comprises at least one battery compartment provided at one of said first or second ends, said battery compartment containing said battery source, wherein said battery source contains one or more batteries for powering said one or more light emitting diodes.

5. The light assembly of claim 4 wherein said battery compartment is rotatably and removably fixed at one of said first or second ends.

* * * * *

UNITED STATES PATENT AND TRADEMARK OFFICE
CERTIFICATE OF CORRECTION

PATENT NO. : 8,770,770 B2  
APPLICATION NO. : 12/983227  
DATED : July 8, 2014  
INVENTOR(S) : Shew et al.

Page 1 of 1

It is certified that error appears in the above-identified patent and that said Letters Patent is hereby corrected as shown below:

On the title page (73) Assignee: delete "Show" and insert --Shew--.

In the Claims

Claim 1, Column 6; Line 4; delete "cans" and insert --caps--.

Claim 2, Column 6; Line 27; delete "ca" and insert --cap--.

Signed and Sealed this  
Fourth Day of November, 2014

Michelle K. Lee  
*Deputy Director of the United States Patent and Trademark Office*